June 16, 1931.  E. PUGH  1,810,225
METHOD OF AND APPARATUS FOR WELDING
Filed Oct. 11, 1927
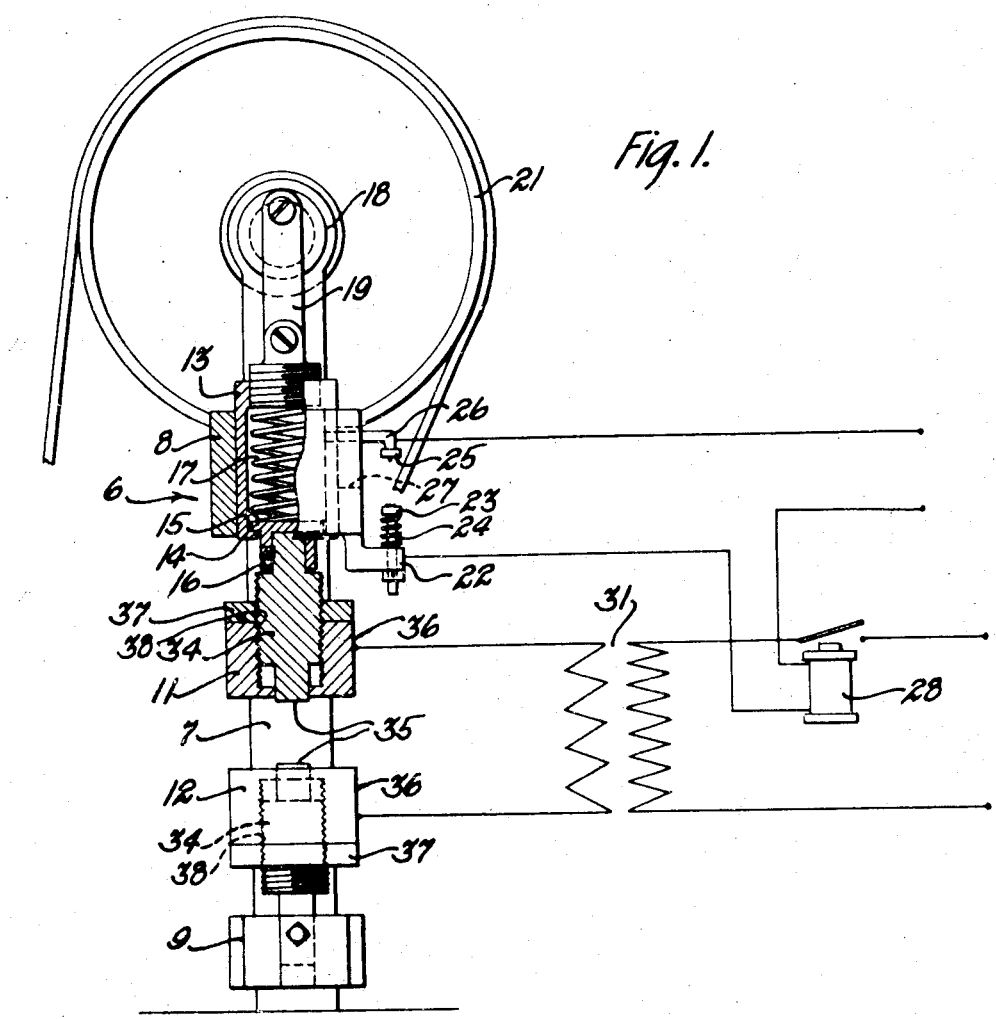
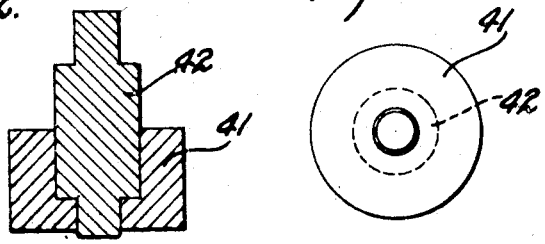
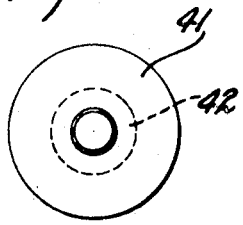
Inventor
Emerson Pugh
by H.A. Patterson Att'y.

Patented June 16, 1931

1,810,225

UNITED STATES PATENT OFFICE

EMERSON PUGH, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR WELDING

Application filed October 11, 1927. Serial No. 225,591.

This invention relates to a method of and apparatus for welding, and more particularly to a method of and apparatus for welding metals having a high electrical conductivity.

The spot welding of metals having a high conductivity such as copper, aluminum or aluminum alloys is accomplished in many instances by exerting a pressure upon the electrodes between which the work is held and applying a current to the work which is interrupted when the material softens and the electrodes have moved a predetermined distance. In practicing this method it frequently happens that the material being welded softens and gives way under the electrode before the weld is complete, interrupting the current prematurely.

Objects of the present invention are to provide a method and apparatus for welding in which the initial unit area pressure upon the electrodes is decreased upon a predetermined movement of the electrodes while the welding current is controlled independently of the pressure.

The invention contemplates the provision of a method and an apparatus for practicing the method in which the welding current is applied to a definite, restricted area while a predetermined pressure is maintained on the area and upon a softening of the metal in that area the metal is forced firmly together at the point being welded whereupon the pressure is relieved until the welding current is interrupted. In accordance with one embodiment of the invention, an electrode is provided whose contacting surface is surrounded by a non-conducting surface which engages the work subsequently to the softening of the material being welded to decrease the pressure per unit area upon the contacting surface of the electrode and prevent further movement of the electrode while the weld is being completed.

It is believed that a complete understanding of the invention may be had by reference to the following description, taken in conjunction with the accompanying drawings, in which Fig. 1 is a fragmentary view of a welding apparatus embodying the invention with a diagrammatic representation of the circuit connections;

Fig. 2 is an enlarged longitudinal sectional view of a modified form of the invention, and Fig. 3 is an end view of the electrode shown in Fig. 2.

Referring to the drawings in which the same reference characters designate similar parts in the several views, the invention is shown embodied in a welding machine 6 mounted upon a vertical column 7. Extending forwardly from the vertical column 7 are a pair of arms 8 and 9 which carry electrodes 11 and 12, respectively. A hollow cylindrical member 13 is reciprocally mounted in the arm 8 and is provided at its lower end with an inwardly extending flange 14 which engages a head 15 of an electrode holder 16 to which the electrode 11 is attached. The head 15 is yieldably engaged with the flange 14 by means of a spring 17 so that when the electrode comes in contact with the work the reciprocating member 13 may complete its stroke. The upper end of the reciprocating member 13 is pivotally attached to a connecting link 19, the other end of which is eccentrically and pivotally mounted upon a wheel 18 which is rotated by a drive wheel 21 operated from any suitable source of power (not shown.)

In order to control the welding current, a timing device is provided which consists of a bracket 22 attached to the arm 8 carrying a contact member 23 which is resiliently mounted in the bracket 22 and is held in its uppermost position by means of a spring 24. A second contact member 25 is carried by a pin 26 which is attached to the reciprocating member 13 through a slot 27. In the reciprocation of the electrode 11 the contacts 23 and 25 will close the control circuit to energize a relay 28 through any suitable source of current (not shown) closing the primary circuit of a transformer 31 to energize the electrodes 11 and 12 from any suitable source of current (not shown).

The electrodes 11 and 12 each comprise a core 34 of a material suitable for use in an electrode such as copper. The end of the core 34 is provided with a tip 35 of a diameter of such a dimension as to be suitable for forming the contact area of the electrode. The cylindrical surface of the core 34 is provided with threads 38 and is adapted to receive a similarly threaded cap 36 which may be held in position by means of a lock nut 37. The cap 36 is provided with a coating of phosphate of iron commonly known as a Parkerized finish for the purpose of rendering the cap non-conductive. The cap 36 may be adjusted upon the core 34 to permit the tip 35 to project the proper distance and also to adjust for wear on the end of the tip. Fig. 2 shows a modified form of an electrode in which a cap 41 having a coating of phosphate of iron is pressed over the core 42. In this form of the invention the length of the projecting tip is not adjustable.

In the operation of the device sheets of material to be welded are placed between the electrodes and the electrodes are brought in contact with the material. After a predetermined movement of the reciprocating member 13 the contacts 23 and 25 will be engaged to actuate the relay 28 closing the primary circuit of the transformer 31 and causing a welding current to flow through the sheets to be welded. When the material softens, the tips 35 will be pressed into the material until the end surface of the cap 36 comes into contact with the material causing the pressure to be distributed over a large area and reducing the pressure per unit area to such an extent that the further movement of the tip 35 into the material will be arrested. The welding current is preferably of a high density such as .2 to .35 amperes per circular mil and is applied for a very short time. After the current has flowed a predetermined time the contacts 23 and 25 will be disengaged due to the upward movement of member 13 deenergizing the welding circuit by the deenergization of relay 28 whereupon the electrodes will be withdrawn from the work and the work may be shifted to another position to form another weld in a similar manner. It will thus be seen that the pressure on the electrodes and the welding current are controlled independently insuring that the weld will be complete before the current is interrupted and permitting the current to be interrupted before the electrodes are withdrawn from the work.

It will be understood that the invention herein described and illustrated is capable of many other modifications without departing from the spirit and scope of the invention.

What is claimed is:

1. In a welding apparatus, a pair of electrodes, means for engaging the electrodes with the work, means for exerting a pressure on the electrodes, means for applying a current to the electrodes, means insulated from the work for decreasing the unit area pressure on the conducting surfaces of the electrodes, and independent means for controlling the application of the welding current.

2. In a welding apparatus, an electrode having a surface for engaging the work under pressure and a second surface offset with respect to the first mentioned surface and insulated from the work for reducing said pressure under predetermined conditions, and means for controlling the current through the electrode.

3. In a welding apparatus, an electrode having a work engaging surface, and a cap for the electrode having a coating of phosphate of iron and provided with a work engaging surface slightly offset from work engaging surface of the electrode.

4. In a welding apparatus, an electrode having a threaded core and a projecting tip, and a cap insulated from the work and adjustably mounted upon the threaded core for allowing the tip to project therethrough.

5. In a welding apparatus, an electrode having a core and a projecting tip, and a cap adjustably mounted on the core to predetermine the projecting distance of the tip.

6. In a welding apparatus, an electrode having a tip for contacting with the work and a cap having a coating of phosphate of iron covering the electrode and allowing the tip to project.

7. A method of welding, which consists of applying and confining a current to an initial contacting area of constant size to the material to be welded to produce a welding action, and subsequently distributing a pressure over a larger area as the welding action progresses while confining the current to the initial contact area.

8. In a welding apparatus, an electrode having a threaded core and a projecting tip, a cap insulated from the work and adjustably mounted upon the threaded core to allow the tip to project therethrough, and means for locking the cap to the threaded core.

9. In a welding apparatus, an electrode having a core and a projecting tip, a cap adjustably mounted on the core to predetermine the projecting distance of the tip, and resilient means for actuating the electrode.

10. In a welding apparatus, an electrode having a threaded core and a projecting tip, and a cap insulated from the work and from the tip and adjustably mounted upon the threaded core for allowing the tip to project therethrough.

11. A method of welding which comprises applying pressure to an electrode in contact with the material to be welded while passing a welding current through the electrode to the material to produce a welding action, and subsequently distributing the pressure over a larger area as the welding action progresses while confining the current to the initial contact area of the electrode.